(12) United States Patent
Berdichevsky et al.

(10) Patent No.: US 8,336,886 B2
(45) Date of Patent: *Dec. 25, 2012

(54) CONTAMINANT EXCLUSION SEAL

(75) Inventors: Alexander Berdichevsky, Farmington Hills, MI (US); Sumit Moondra, Manchester, NH (US); Anthony D. Joquico, Macomb, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 882 days.

This patent is subject to a terminal disclaimer.

(21) Appl. No.: 12/030,601

(22) Filed: Feb. 13, 2008

(65) Prior Publication Data

US 2008/0128997 A1 Jun. 5, 2008

Related U.S. Application Data

(63) Continuation-in-part of application No. 11/619,048, filed on Jan. 2, 2007, now Pat. No. 8,016,293.

(60) Provisional application No. 60/755,828, filed on Jan. 3, 2006.

(51) Int. Cl.
*F16J 15/32* (2006.01)
(52) U.S. Cl. .......................................... 277/573; 277/572
(58) Field of Classification Search .................. 277/551, 277/572, 573, 574, 576, 577
See application file for complete search history.

(56) References Cited

U.S. PATENT DOCUMENTS

| | | | |
|---|---|---|---|
| 4,037,848 A | 7/1977 | Prescott et al. | |
| 4,037,849 A | 7/1977 | Thumm | |
| 4,206,009 A | 6/1980 | Kazares | |
| 4,252,329 A | 2/1981 | Messenger | |
| 4,928,979 A | 5/1990 | Nagasawa | |
| 4,936,591 A | 6/1990 | Romero | |
| 4,992,023 A | 2/1991 | Baker et al. | |
| 5,186,472 A | 2/1993 | Romero et al. | |
| 5,201,528 A | 4/1993 | Upper et al. | |
| 5,286,038 A | 2/1994 | Abraham et al. | |
| 6,357,751 B1 | 3/2002 | Rentschler et al. | |
| 6,513,812 B1 | 2/2003 | Yang et al. | |
| 6,561,519 B1 | 5/2003 | Frese et al. | |
| 2004/0150168 A1 | 8/2004 | Heathcott et al. | |

*Primary Examiner* — Gilbert Lee
(74) *Attorney, Agent, or Firm* — Daniel J. Sepanik, Esq.; Harness, Dickey & Pierce, P.L.C.

(57) ABSTRACT

A seal assembly for sealing a space between a rotating shaft and a housing. In this regard, the seal assembly includes a rotating component connected to the shaft, and a stationary component connected to the housing. A first seal is connected to the rotating component and a second seal is connected to the stationary component. The first seal includes at least one dispersion member that generates a fluid disturbance in a region adjacent the space during rotation of the rotating component and a discontinuity that provide a pathway for a contaminant to exit the space.

14 Claims, 8 Drawing Sheets

CONTAMINANT EXCLUSION SEAL

CROSS-REFERENCE TO RELATED APPLICATIONS

This application is a continuation-in-part of U.S. patent application Ser. No. 11/619,048 filed on Jan. 2, 2007, now U.S. Pat. No. 8,016,293, which claims the benefit of U.S. Provisional Application No. 60/755,828, filed Jan. 3, 2006. The disclosures of the above applications are incorporated herein by reference.

FIELD

The present disclosure relates to a seal assembly for a rotating shaft.

BACKGROUND

The statements in this section merely provide background information related to the present disclosure and may not constitute prior art.

Automotive vehicles include rotary shafts that are at least partially received in and rotate relative to a stationary housing. Examples of such arrangements are found in conventional transmissions and axle assemblies. It is necessary to provide a seal at the interface between the shaft and the housing. Sealing the interface is necessary because under many driving conditions, especially during rain, large amounts of contaminants are present that could enter into the interface between the shaft and the housing and cause eventual problems. Conventional sealing arrangements typically include a rubber lip seal to prevent contaminants from entering into the system. Further, the rubber lip seals are used to keep lubricant from exiting the system.

There are several problems with conventional rubber lip seals. First, rubber lip seals tend to wear out in an undesirable fashion. The rotary shafts on most vehicles rotate at very high speeds and the constant contact between the rotating shaft and the rubber lip seal causes the seal to wear. Furthermore, the presence of contaminants along the contact area between the shaft and the rubber lip seal often cause significant wear on the seal, which results in short seal life.

A further problem exists in that the rotary shafts have some radial and axial movement relative to the housing. With conventional lip seals, such movement is not compensated for and, a proper seal is not maintained. Under these conditions, it is more likely that outside contaminants will enter into the shaft and housing interface, and, moreover, become lodged between the lip seal and the shaft which results in faster wear-out of the seal.

SUMMARY

The present teachings provide a seal assembly for sealing a space between a rotating shaft and a housing. In this regard, the seal assembly includes a rotating component connected to the shaft, and a stationary component connected to the housing. A first seal is connected to the rotating component and a second seal is connected to the stationary component. The first seal includes at least one dispersion member that generates a fluid disturbance in a region adjacent the space during rotation of the rotating component. In this manner, any contaminants that may be prone to enter the space are dispersed away from the space and prevented from entering.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
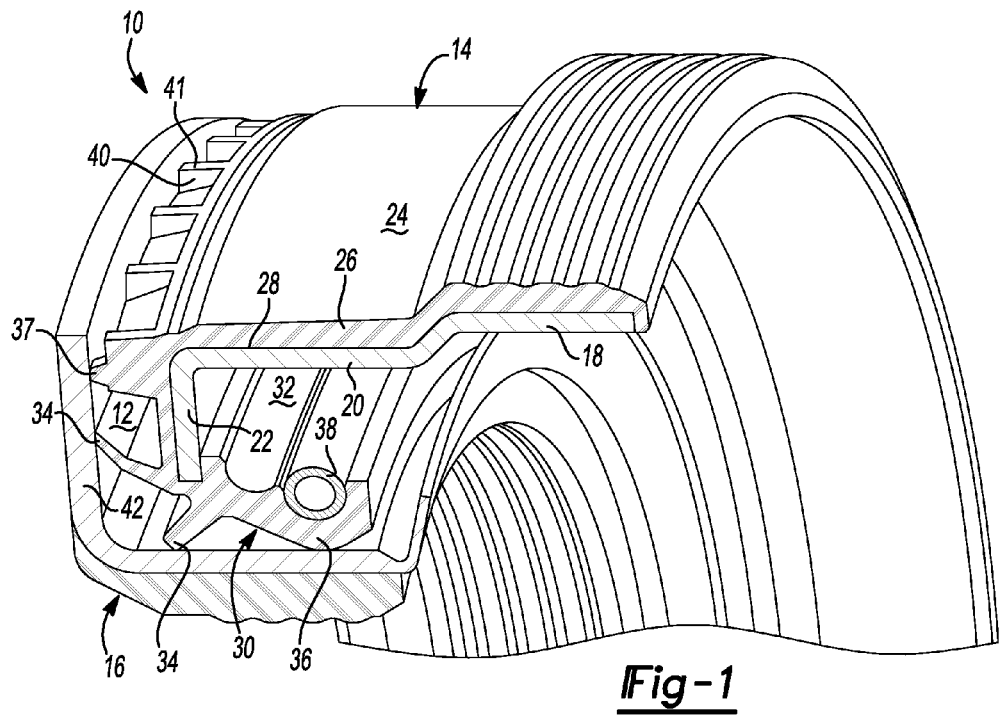
FIGS. 1 and 1A are perspective cross-sectional views of a seal assembly according to the present teachings.
Figure 1A:
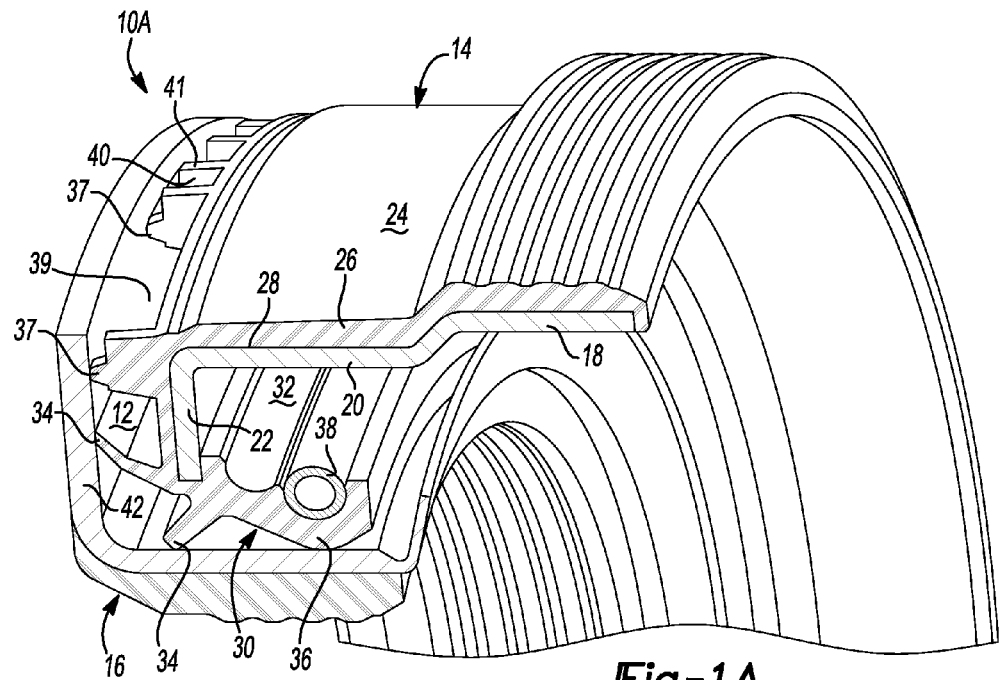

Referring to FIGS. 1 and 1A, the present teachings provide a seal assembly 10 and 10A that seals an interface 12 between a stationary shaft and a rotating housing or hub. Seal assemblies 10 and 10A include a rotating component 14 and a stationary component 16. The rotating component 14 is generally connected to the rotating hub (not shown) and rotates therewith. The stationary component 16 is generally connected to a stationary shaft (not shown). It should be understood that although FIGS. 1 and 1A depict a configuration where a hub rotates relative to a stationary shaft, the present teachings are equally applicable to a stationary housing and a rotating shaft.

The rotating component 14 of the seal assembly 10 includes a sealing ring 18 which includes an axial leg 20 that extends axially relative to the stationary shaft, and a radial leg 22 that extends radially relative to the stationary shaft. Disposed on the sealing ring 18 is a seal 24 that includes a radially outer portion 26 that is connected to and supported by a radially outer surface 28 (i.e., a surface disposed on a side of the axial leg opposite to the stationary shaft) of the axial leg 20, and a dynamic sealing portion 30 that is connected to and supported by the radial leg 22 of the sealing ring 18.

The seal 24 is generally formed of a rubber-, polymeric- or elastomeric-based material that has a low coefficient of friction and is resistant to wear. For example, the seal 24 may be formed of rubber-based materials such as natural rubber, EPDM, EPM, and the like. Polymeric-based materials include, for example, materials such as PTFE. Elastomeric materials include FKM and ACM materials.

The dynamic portion 30 of the seal 24 is designed to prevent a medium from exiting a space 32 to be sealed off. In this regard, the dynamic portion 30 of the seal 24 includes a main sealing portion 36. Main sealing portion 36 is tensionally biased towards the stationary component 16 of the seal assembly 10 by a biasing member 38 or spring. The main sealing portion 36 is the portion of the seal 24 that provides the main sealing function of preventing, or at least substantially minimizing, the medium to be sealed from exiting the space 32 to be sealed off.

Axially outward (i.e., to the left in the figure) from the main sealing portion 36 and the space 32 to be sealed off are dust lips 34. Dust lips 34 assist in preventing dust, dirt, and other contaminants from entering into the space 32 to be sealed. Although the seal 24 shown in FIG. 1 is shown to be a monolithic or unitary seal, it should be understood that the dynamic sealing portion 30 and radially outer sealing portion 26 may be formed separately on the sealing ring 18, and may also be formed of different materials. In this regard, it should be understood that the dynamic sealing portion 30 is generally connected to the radial leg 22 of the sealing ring 18, while the radially outer sealing portion 26 is connected to and supported by the axial leg 20 of the sealing ring 18.

Seal 24 may also include a bumper 37. Bumper 37 may be integral with seal 24 and may be used to absorb forces that may be exerted on seal 24 when seal 24 is installed into the hub (not shown). In this regard, bumper 37 may be designed to absorb loads that may range in the hundreds of pounds per square inch.

The radially outer sealing portion 26 includes a plurality of dispersion members 40 or fins that extend radially outward with respect to the axial leg portion 20 of the sealing ring 18. The dispersion members 40 include a radially outermost free end 41. The dispersion members 40 are designed to generate a fluid disturbance as the rotating component 14 of the seal assembly 10 rotates along with the rotating hub. That is, as the hub and rotating component 14 of the seal assembly 10 rotate, the dispersion members 40 create a fluid disturbance similar to vanes of a rotating pump. In this manner, any contaminants such as dust, dirt, or slurry that may attempt to approach the interface 12 between the seal 24 and the shaft are moved or blown away from the interface 12 by the fluid disturbance caused by the rotation of the dispersion members 40.

As described above, the dispersion members 40, when rotating with the rotating component 14 of the seal 24, provide a fluid disturbance that blows away contaminates from the interface 12 between the seal 24 and the stationary component 16. This is significant because as the seal 24 and hub rotate, axial and radial movement of the hub may occur. Accordingly, the rotating seal 24 and hub may oscillate back and forth from the stationary component 16 of the seal assembly 10. Without the fins 40 of the rotating seal 24, dust and other contaminants have a greater likelihood of entering the space 32 to be sealed off when the rotating component 14 moves axially away from the stationary component 16 because the sealing lips 34 will not come into contact with the radial leg of the sleeve 42 of the stationary component 16.

This greater likelihood, as stated above, may further deteriorate the seal 24 when dirt or other contaminates get between the seal 24 and the stationary component 16.

Figure 2:
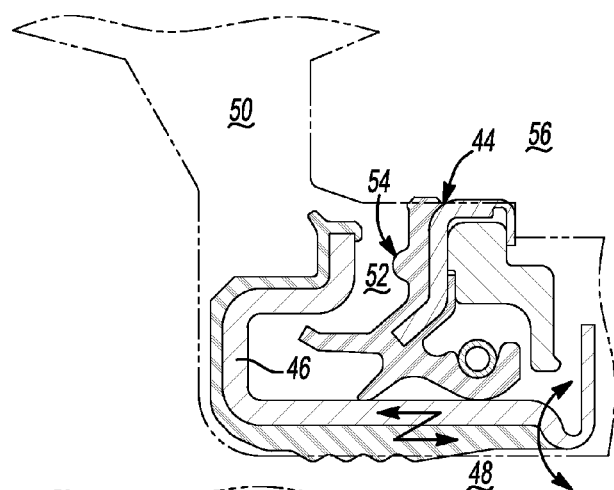
FIG. 2 is a cross-sectional view of a prior art seal assembly.

More particularly, referring to FIG. 2, a prior art seal will now be described. As can be seen in FIG. 2, the prior art sealing assembly includes a stationary seal 44 and a sleeve 46 that is rotatably coupled to a rotating shaft 48. During rotation of the shaft 48, the rotating sleeve 46 can move back and forth axially, as well as radially. During this axial and radial movement of the sleeve 46, the volume 50 of air present between the stationary seal 44 and the rotating shaft 48 can vary. During the axial movement of the shaft 48 and sleeve 46, the volume 50 may be compressed quickly, which may force the volume 50 of air, water, and dust to expel from the space 52 adjacent to the outside face 54 of the seal 44. This rapid compression may force some of the mixture of air and contamination past the seal 44 each time the shaft 48 axially strokes. As the shaft 48 then moves axially away from the housing 56, the sudden increase in air volume 50 may tend to draw air and any contamination contained in the air to the seal outside face area 54 that can be pushed past the seal 44 at the next axial shaft compression motion.

Figure 3:
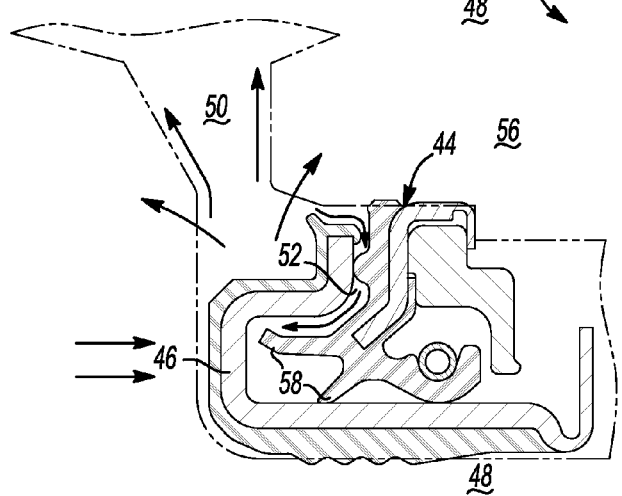
FIG. 3 is a cross-sectional view depicting axial movement of a prior art seal assembly.
Figure 4:
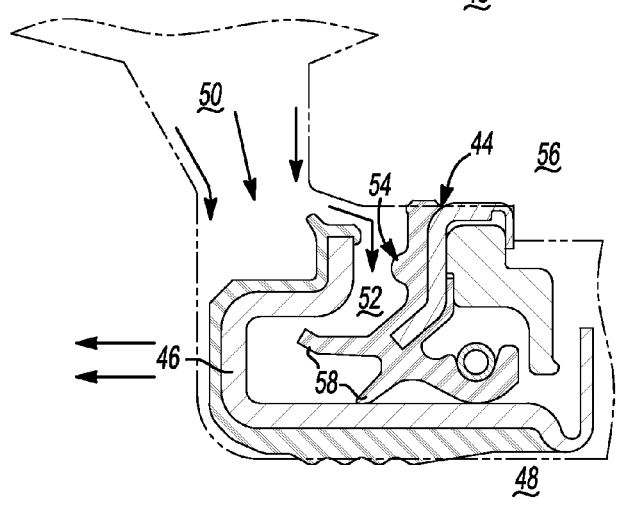
FIG. 4 is another cross-sectional view depicting axial movement of a prior art seal assembly.

This phenomenon is shown more particularly in FIGS. 3 and 4. As the rotating sleeve 46 and shaft 48 moves back and forth axially, air and contaminants may be forced between the rotating sleeve 46 and the stationary seal 44. This occurs even though sealing lips 58 are present on the stationary seal 44 due to pressure differentials that become great due to the change in air volume 50 as the rotating sleeve 46 and shaft 48 move back and forth. Again, this is undesirable in that contaminants that enter between the rotating sleeve 46 and stationary seal 44 may degrade the life expectancy of the stationary seal 46.

To combat this, as shown in FIGS. 5 through 12 and in accordance with the present teachings, the rotating sleeve 46 may be provided with a seal 60.5, 60.6, 60.7, 60.8, 60.9, 60.10, 60.11, and 60.12, respectively (hereinafter referred to as "seal 60"), formed thereon that includes the dispersion members 62.5, 62.6, 62.7, 62.8, 62.9, 62.10, 62.11, and 62.12, respectively (hereinafter referred to as "dispersion member 62"), that extend radially with respect to an axial portion 64 of the rotating sleeve 46. Similar to the embodiment described with reference to FIG. 1, the dispersion members 62 rotate along with the rotating sleeve 46, which provides a fluid disturbance which blows away or disperses any contaminants from entering between the rotating sleeve 46 and the stationary seal 44. The dispersion members 62 include a radially outermost free end 63.

Figure 5:
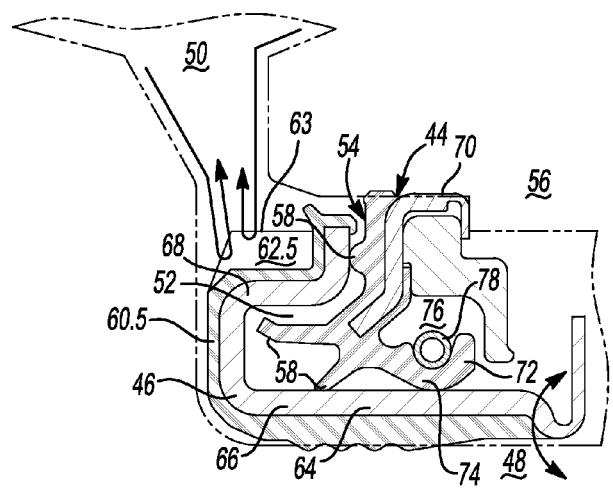
FIG. 5 is a cross-sectional view of a seal assembly according to the present teachings.
Figure 6:
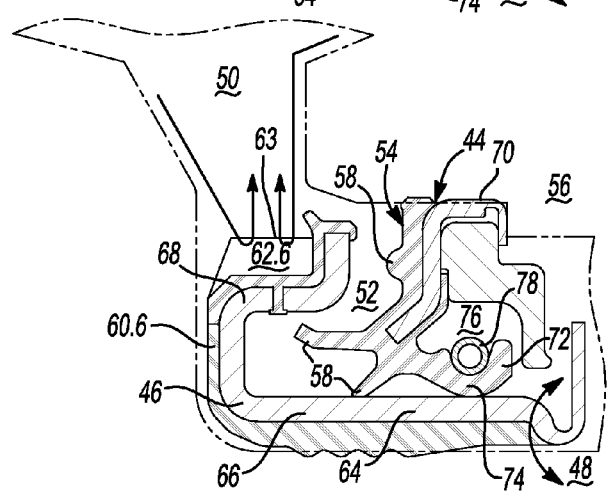
FIG. 6 is another cross-sectional view of a seal assembly according to the present teachings.

Specifically shown in FIGS. 5 and 6, even when the rotating sleeve 46 moves back and forth such that the stationary sleeve 46 contacts the dynamic seal 44, the contaminants are forced and blown away by use of the rotating fins 62. The dispersion members 62 also reduce the available volume 50 of air adjacent the outside face 54 of the seal 44, which further reduces the potential for contaminant ingestion.

The seal assemblies shown in FIGS. 5 through 12 include a sleeve assembly 46 that is attached to a rotating shaft 48, and a stationary seal 44 assembly that is connected to a housing 56. The sleeve assembly 46 includes a generally annular ring 66 that includes axial portion 64 that engages the rotating shaft 48, and an S-shaped radial portion 68 that extends radially relative to the axial portion 64. The dispersion members 62 are disposed on the S-shaped radial portion 68 and also extend radially outward relative to the axial portion 64. In this manner, as the sleeve assembly 46 and rotating shaft rotate 48, the dispersion members 62 also rotate which generates a fluid disturbance that blows away contaminants from the interface 52 between the sleeve assembly 46 and the stationary seal 44.

The stationary seal assembly connected to the housing 56 includes a sealing ring 70 having a dynamic seal 72 attached thereto. Similar to the seal assembly 10 shown in FIG. 1, the dynamic seal 72 includes a main sealing portion 74 that seals a medium from a space 76 to be sealed off. The main sealing portion 74, again, is tensionally biased toward the axial portion 64 of the sleeve assembly 46 by a biasing member 78 or spring. The dynamic seal 72 also includes dust lips 58 which further assist in preventing, or at least substantially minimizing, the entrance of the contaminants into the space 76 to be sealed off. Dust lips 58 may include radially inwardly extending as well as axially extending dust lips, as shown.

Also similar to the configuration shown in FIG. 1, the materials that form the dispersion members 62 and dynamic seal 72 are generally rubber- or polymeric-based materials such as natural rubber, EPDM, EPM, or PTFE. These materials assist in reducing the coefficient of friction between the seal 72 and the rotating elements 46 and 48, and are resistant to wear. Elastomeric materials such as FKM and ACM may also be used.

Now referring to FIGS. 7 through 12, various configurations of the dispersion members 62 or rotating fins are depicted. As can be seen in these figures, the configuration of the fins 62 can be varied according to various parameters that further assist in blowing and dispersing contaminants away from the interface between the rotating sleeve and the stationary seal. Regardless of the configuration shown in these figures, it should be understood that the aspect of the present teachings is to disperse contaminants away from the interface 52 between the dynamic seal 72 and the stationary sleeve 46. It should also be understood that in accordance with the present teachings, the dispersion members 62 should be disposed radially outward relative to the rotating shaft 48. In this regard, the rotating fins 62 blow the contaminants in an outward fashion away from the interface 52 between the seal 44 and sleeve 46. This further assists in removing contaminants from the interface region 52.

Figure 7:
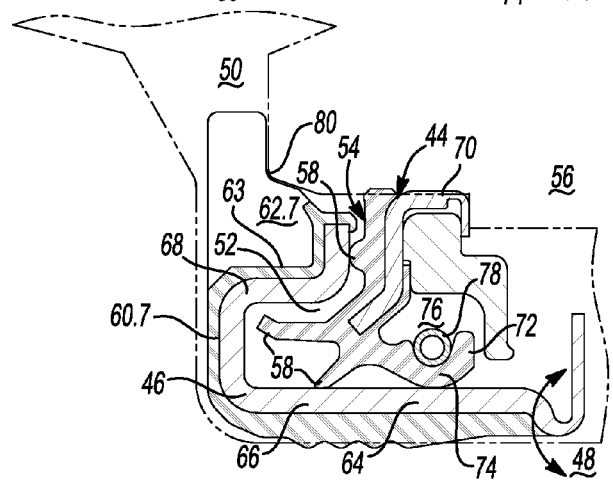
FIG. 7 is another cross-sectional view of a seal assembly according to the present teachings.
Figure 8:
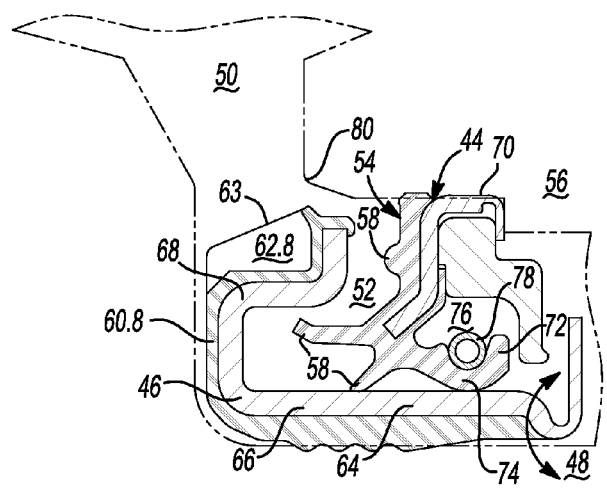
FIG. 8 is another cross-sectional view of a seal assembly according to the present teachings.
Figure 9:
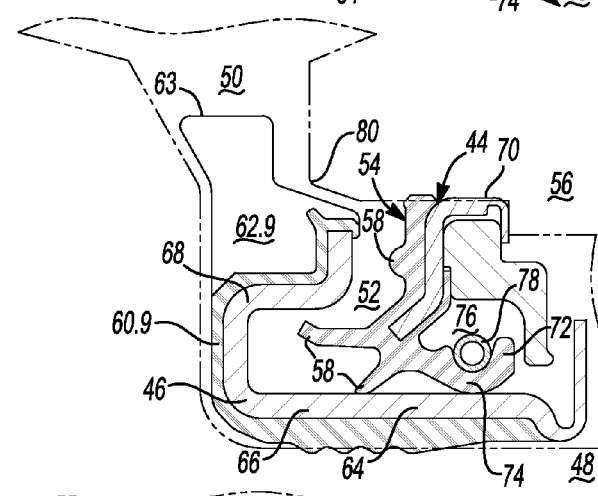
FIG. 9 is another cross-sectional view of a seal assembly according to the present teachings.
Figure 10:
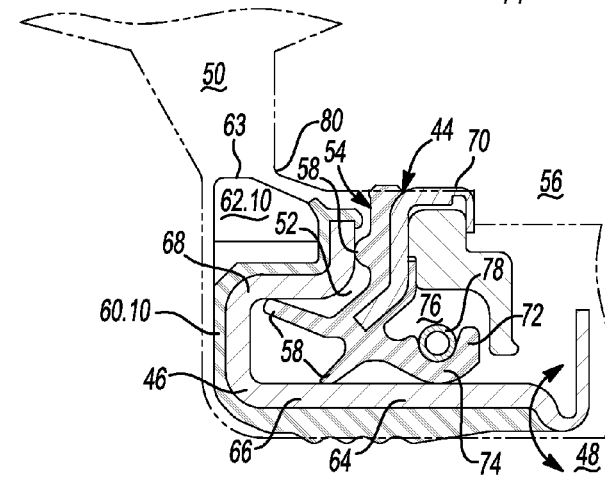
FIG. 10 is another cross-sectional view of a seal assembly according to the present teachings.
Figure 11:
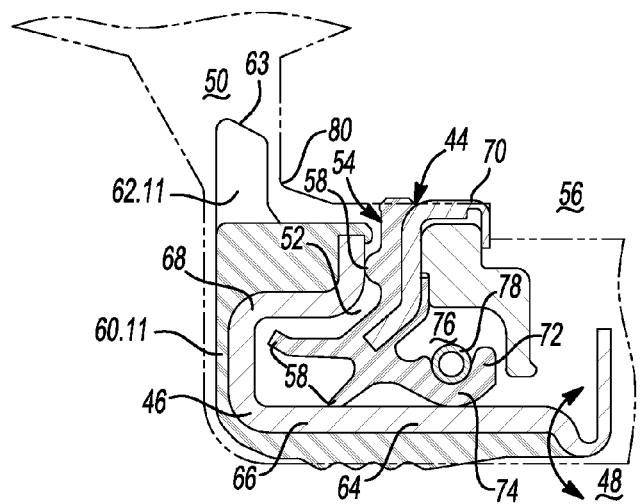
FIG. 11 is another cross-sectional view of a seal assembly according to the present teachings.
Figure 12:
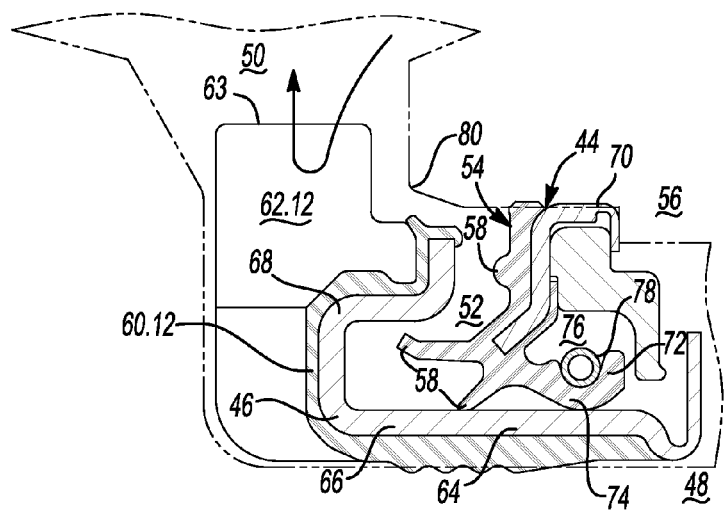
FIG. 12 is another cross-sectional view of a seal assembly according to the present teachings.
Figure 13:
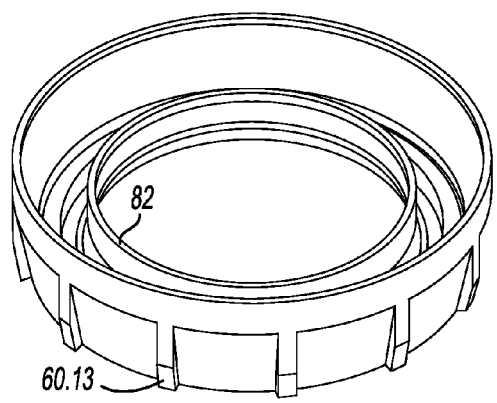
FIG. 13 is a perspective view of an annular ring including a plurality of dispersion members in accordance with the present teachings.
Figure 14:
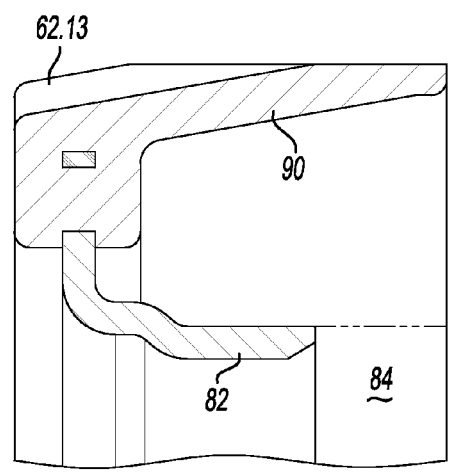
FIG. 14 is a cross-sectional view of the annular ring shown in FIG. 13.

As can be seen in FIGS. 7-12, the configurations of the dispersion members 62 have various geometries that increase the amount of fluid disturbance during rotation of the dispersion members 62. It should also be understood that the various geometries of the dispersion members 62 enable the seal assemblies of the present teachings to be adapted to any size space or type of shaft 48 to be sealed. For example, the dispersion members 62 can have a geometry or shape that enables contact with a housing bore or face 80 (FIG. 7). Alternatively, the dispersion members 62 may have a geometry or shape that follows a contour of the housing bore or face 80, without contacting the housing bore or face 80. In this regard, however, it should also be understood that any size or shape of the dispersion members 62 is acceptable so long as the dispersion member 62 extends radially outward relative to the rotating shaft 48.

It should be understood that although each of the above configurations depict the dispersion members 62 being integrally connected to a seal 60, the present teachings should not be limited thereto. In this regard, the dispersion members 62 may be a separately installed component of the seal 60. For example, the dispersion members 62 may be snap-fit (FIG. 6) or pressed (FIG. 12) onto the various seals 60 connected to the rotating sleeves 46.

Figure 15A:
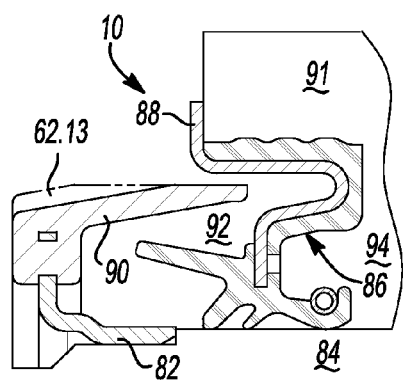
FIGS. 15A to 15C are cross-sectional views of a sealing assembly including the annular ring shown in FIG. 13.
Figure 15B:
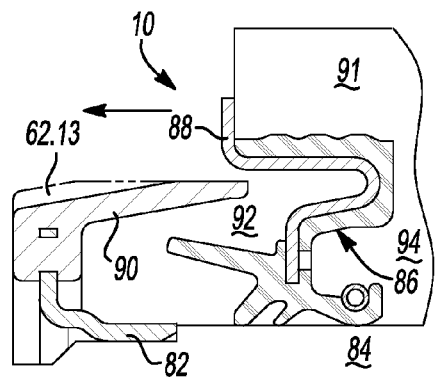
Figure 15C:
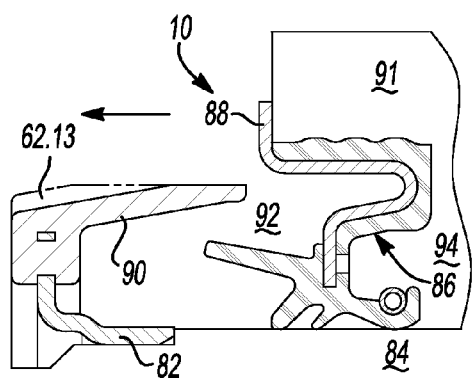

Now referring to FIGS. 13 through 15C, an alternative configuration will be described. As can be seen in these figures, the dispersion members 62.13 (hereinafter referred to as "dispersion member 62") are formed on an annular ring 82 that is rotatably coupled to the rotating shaft 84 (FIGS. 15A-15C). The dynamic seal 86 is coupled to a sealing ring 88, which in turn is coupled to the housing 91. The dynamic seal 86 in this configuration directly contacts the rotating shaft 84.

As stated above, the annular ring 82 supports the plurality of dispersion members 62. As shown, in the figures, the annular ring 82 supports an axial portion 90 that extends axially in the direction of the dynamic seal 86. The dispersion members 62 extend radially outward from the axial portion 90. Again, during rotating of the annular ring 82, the dispersion members 62 create a fluid disturbance that blows contaminants away from the interface region 92 between the annular ring 82 and the dynamic seal 86. In this manner, contaminants are prevented, or at least substantially minimized, from entering the interface region 92 and the space 94 to be sealed off.

Further, as can be seen in FIGS. 15A to 15C, the configuration of the seal assembly enables axial movement of the rotating shaft 86 and annular ring 82 relative to the dynamic seal 86. Despite this axial movement, however, the dispersion members 62 blow contaminants from the interface region 92.

Although the dispersion members 40 and 62 illustrated in FIGS. 1, 1A, and 5-15C blow contaminants away from interfaces 12 (FIGS. 1 and 1A), 52 (FIGS. 5-12), and 92 (FIGS. 15A-15C) and reduces the possibility of contaminants entering the interfaces 12, 52, and 92, there remains a possibility that contaminants may enter the interfaces 12, 52, and 92 as the components of the seal assemblies wear. For example, again referring to FIGS. 1 and 1A and as stated above, bumper 37 may be subjected to substantial loads during installation of seals 10 and 10A. Because bumper 37 abuts sleeve 42 under such a high load, bumper 37 may be prone to wear. As bumper 37 wears, contaminants may enter the interface 12.

Once contaminants have entered interface 12, it may be very difficult for the contaminant to escape due to the constant pressure experienced by bumper 37 against sleeve 42. Further, if the contaminant is a slurry, the water may evaporate leaving solid particulate behind that continues to grow as time passes. An increase in particulate or contaminant may be detrimental to dust lips 34 and main sealing portion 36 in that the useful life of dust lips 34 and main sealing portion 36 may be decreased and may eventually cause the seals 10 and 10A to fail.

Figure 16:
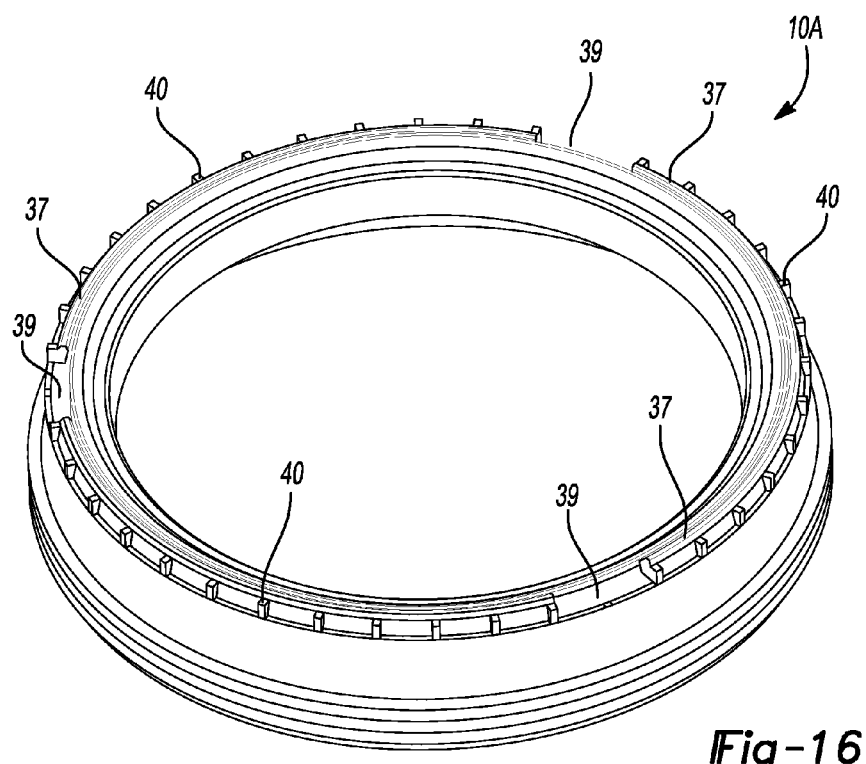
FIG. 16 is a perspective view of the seal assembly shown in FIG. 1A.

To provide an exit for any contaminant that may enter interface 12, bumper 37 may be provided with a plurality of discontinuities or spaces 39 formed circumferentially around seal 10A. As best shown in FIG. 16, spaces 39 in bumper 37 are formed at 120 degree intervals around seal 10A. Spaces 39 provide an exit pathway for any contaminate or slurry that may not be blown away by dispersion members 40 and may enter interface 12. Additionally, spaces 39 provide a pressure to be released from interface 12 that may be generated during rotation of seal 10A about the stationary shaft.

Although spaces 39 are shown disposed around seal 10A at 120 degree intervals, the present teachings should not be limited thereto. For example, spaces 39 may be provided at 60 degree intervals, 90 degree intervals, or 180 degree intervals. Regardless, it should be understood that so long as a sufficient length of bumper 37 is maintained to allow for the substantial loads experienced by seal 10A during installation of seal 10A, any number of spaces 39 at any interval desired may be used. Moreover, spaces 39 may be any length desired so long that a sufficient length of bumper 37 is maintained to allow for the substantial loads experienced by seal 10A during installation of seal 10A. With respect to a depth of spaces 39, spaces 39 may have a depth equal to a thickness of bumper 37, or have a depth that is less than a thickness of bumper 37 to further provide structural integrity to bumper 37.

Furthermore, it should be understood that stationary seals 44 and sleeves 46 illustrated in FIGS. 5-12 may be formed to include discontinuities or spaces 39. More particularly, using the configuration illustrated in FIG. 5 as an example, the lip seal 58 of stationary seal 44 may be modified to function as a bumper and have spaces 39 formed at various intervals formed therein. The lip seal 58 modified to function as a bumper and having spaces 39 formed therein would appear similar to the bumper 37 having spaces 39 illustrated in FIG. 1A, except lip seal 58 would not include dispersion members 40.

Figure 17:
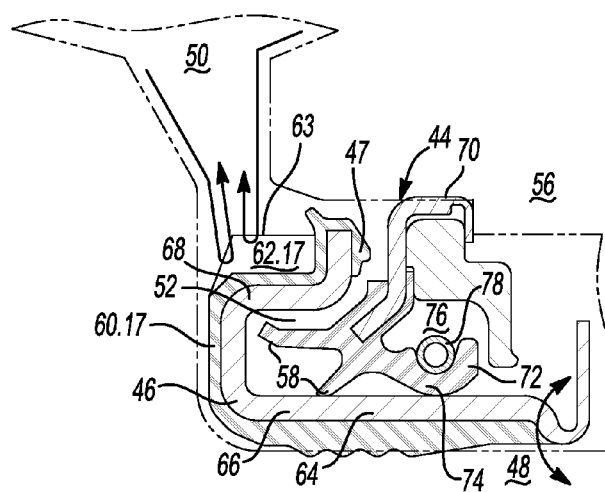
FIG. 17 is a cross-sectional view.

Alternatively, as illustrated in FIG. 17, seal 60 formed on sleeve 46 may be modified to have a bumper 47 having spaces 39 formed therein. Although the configurations in FIGS. 5 and 17 illustrate dust lips 58 and bumper 47 being integral with seal 44 and seal 60, respectively, it should be understood that dust lips 58 and bumper 47 may be snap fit to sealing ring 70 and sleeve 46 in a manner similar to that shown in FIG. 6. That is, lip seal 58 may be snap fit to sealing ring 70 and bumper 47 may be snap fit to sleeve 46 like dispersion members 62 are snap fit to sleeve 46 in FIG. 6.

The description of the present teachings is merely exemplary in nature and, thus, variations that do not depart from the gist of the present teachings are intended to be within the scope of the present teachings. Such variations are not to be regarded as a departure from the spirit and scope of the present teachings.

What is claimed is:

1. A seal assembly for sealing a shaft, comprising:
    a sealing ring; and
    a seal connected to said sealing ring that seals a space adjacent the shaft, said seal configured to rotate relative to the shaft and including a bumper that extends axially relative to an axis of the shaft, said bumper having a plurality of discontinuities in an axial face disposed around a circumference thereof thereby defining bumper regions between said discontinuities that are longer than said discontinuities in a circumferential direction around the circumference of said seal and a plurality of dispersion members that extend radially outward relative to the axis of the shaft,
    wherein during rotation of said seal, said dispersion members generate a fluid disturbance in said space adjacent the shaft and said discontinuities provide a pathway for a contaminant to exit said space.

2. The seal assembly of claim 1, wherein said seal includes a dynamic sealing element.

3. The seal assembly of claim 1, wherein said dispersion members are integral with said seal.

4. The seal assembly of claim 1, wherein said seal is formed of a rubber or polymeric-based material.

5. The seal assembly of claim 1, wherein said dispersion members are fin-shaped.

6. The seal assembly of claim 1, wherein said plurality of dispersion members include a radially outermost free end.

7. The seal assembly of claim 1, wherein said discontinuities are disposed at 120 degree intervals around said circumference.

8. A seal assembly for sealing a space between a rotating shaft and a housing, comprising:
    a rotating component connected to the shaft;
    a stationary component connected to the housing;
    a first seal connected to said rotating component; and
    a second seal connected to said stationary component,
    wherein said first seal is annular and includes:
        a plurality of fin-shaped dispersion members circumferentially spaced about a circumference of said first seal, said fin-shaped dispersion members each extending radially relative to an axis of the shaft; and
        at least one discontinuity that is disposed between adjacent said dispersion members,
        wherein said fin-shaped dispersion members generate a fluid disturbance in a region adjacent the space during rotation of the rotating component and said discontinuity provides a pathway for a contaminant to exit the space.

9. The seal assembly of claim 8, wherein the dispersion member extends from the first seal radially outward relative to an axis of the shaft.

10. The seal assembly of claim 9, wherein the dispersion member includes a radially outermost free end.

11. The seal assembly of claim 8, wherein the second seal includes a dynamic sealing element.

12. The seal assembly of claim 11, wherein said second seal includes a plurality of dust lips.

13. The seal assembly of claim 8, wherein each dispersion member has a contour that matches a contour of the housing.

14. A seal assembly for sealing a shaft, comprising:
    a sealing ring; and
    a seal connected to said sealing ring that seals a space adjacent the shaft, said seal configured to rotate relative to the shaft and including a bumper that extends axially relative to an axis of the shaft, said bumper having a plurality of discontinuities in an axial face disposed around a circumference thereof and a plurality of dispersion members that extend radially outward relative to the axis of the shaft,
    wherein during rotation of said seal, said dispersion members generate a fluid disturbance in said space adjacent the shaft and said discontinuities provide a pathway for a contaminant to exit said space,
    wherein each of said dispersion members entirely extend radially relative to an axis of the shaft, and are separated by ramped portions axially angled toward the axis of the shaft.

* * * * *